United States Patent [19]
Anderson

[11] 4,396,091
[45] Aug. 2, 1983

[54] SELF ADJUSTABLE HARNESS OR SLING

[76] Inventor: Jeffrey J. Anderson, P.O. Box 430, Chester, N.J. 07930

[21] Appl. No.: 248,454

[22] Filed: Mar. 27, 1981

Related U.S. Application Data

[63] Continuation-in-part of Ser. No. 156,748, Jun. 5, 1980, Pat. No. 4,298,091.

[51] Int. Cl.³ .............................................. A62B 35/00
[52] U.S. Cl. ......................................... 182/3; 119/96; 224/184
[58] Field of Search ............................. 182/3, 4–10; 119/96, 101, 102; 224/184, 151, 158, 159, 160; 297/483, 484, 485, 486

[56] References Cited

U.S. PATENT DOCUMENTS

| | | | |
|---|---|---|---|
| 1,991,633 | 2/1935 | Serpico | 119/96 |
| 2,195,334 | 3/1940 | Lethern | 297/484 |
| 2,663,031 | 12/1953 | Kalthoff | 182/3 |
| 2,758,769 | 8/1956 | Nunn | 297/484 |
| 2,856,202 | 10/1958 | Dewees | 297/484 |
| 4,103,758 | 8/1978 | Himmelrich | 182/7 |
| 4,121,688 | 10/1978 | Lirakis | 182/3 |

FOREIGN PATENT DOCUMENTS 142624   5/1920   United Kingdom .................... 182/3

Primary Examiner—Reinaldo P. Machado
Assistant Examiner—Alvin C. Chin-Shue
Attorney, Agent, or Firm—Fisher, Christen & Sabol

[57] ABSTRACT

A harness which may be used as a sling to suspend a person from a support in either a sitting or standing position, or may be placed on the shoulder to exert force on a load includes a closed loop of webbing material which is loosely slidable through a pair of D-rings, and a double length of rope, one end of each length being connected to one of the rings with the other ends being provided with a snap-hook arrangement for encircling a support or for attachment to a load. A slider on the double rope can be moved to adjust the overall size of the sling and the webbing is held by the rings in the form of two supporting loops which adjust to the body size.

In a modified form, two closed loops of webbing pass through the rings and are double back upon themselves to provide a cradle having as many as four loops to support the back and legs. Another variation uses a single length of webbing for attaching the cradle to a support or to a load to be pulled by the user.

8 Claims, 10 Drawing Figures

U.S. Patent  Aug. 2, 1983  Sheet 1 of 2  4,396,091
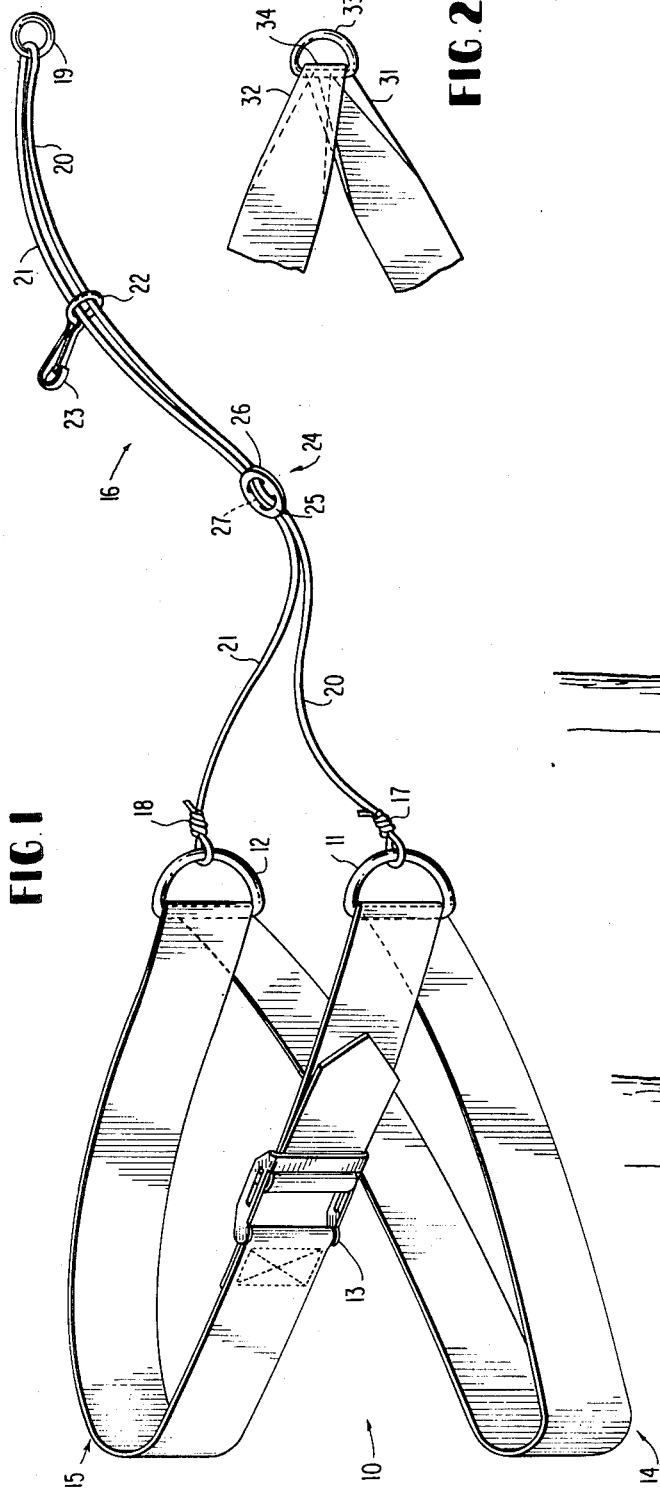
FIG. 1
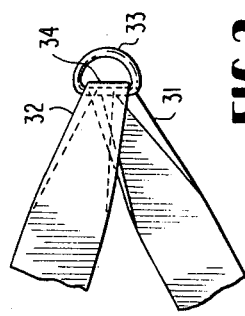
FIG. 2
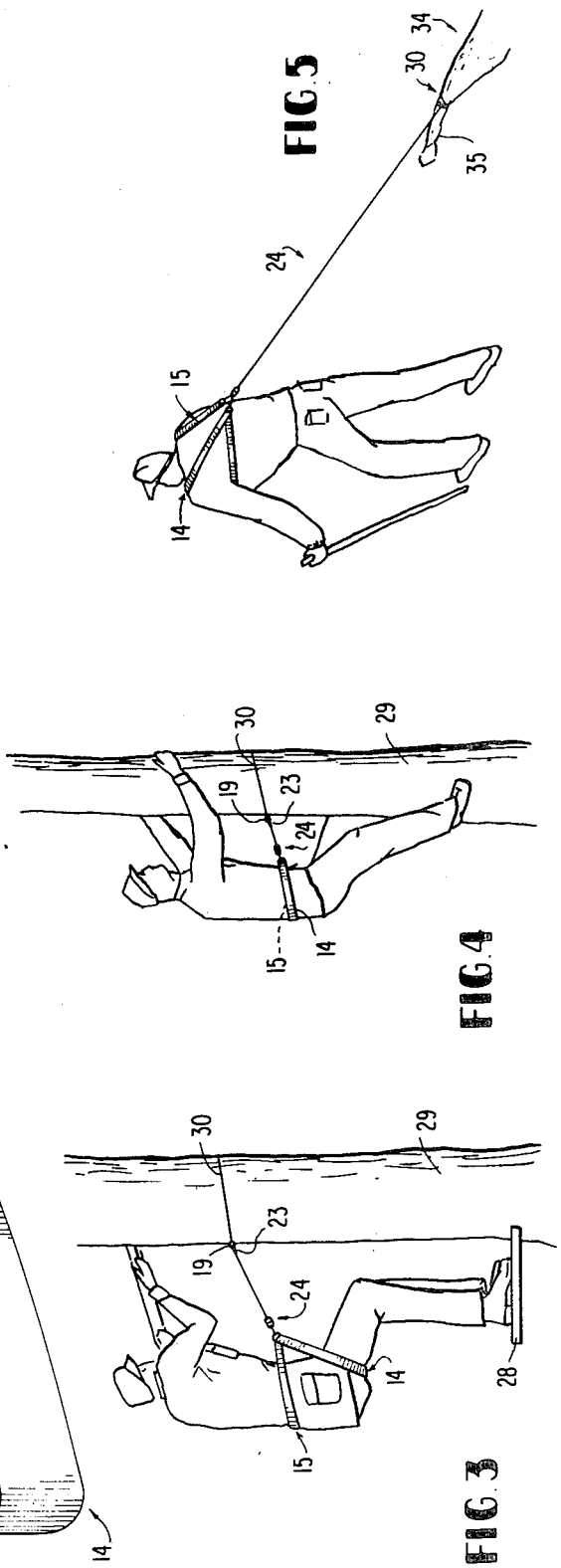
FIG. 5
FIG. 4
FIG. 3

SELF ADJUSTABLE HARNESS OR SLING

CROSS REFERENCE TO OTHER APPLICATIONS

This application is a continuation-in-part of my prior application, Ser. No. 156,748, filed June 5, 1980, now U.S. Pat. No. 4,298,091.

BACKGROUND OF THE INVENTION

The present invention relates to a harness which among many others uses is particularly adaptable to hunters for enabling them to take up a position at a elevated position by providing a seat suspended from a tree limb which allows both hands to be free, and alternatively in the case of large animals, to allow them to drag their quarry over the ground by attaching the harness over the shoulders.

Harnesses made of webbing arranged to form a suspended seat are disclosed in U.S. Pat. Nos. 4,103,758, 2,960,180 and 2,663,031 and a harness which may be attached to the shoulders is shown in U.S. Pat. No. 3,258,788. These harnesses are not specifically intended for dual use and in any event are complex in design and difficult to fabricate.

Other types of harness of somewhat less utility, are shown in U.S. Pat. Nos. 4,120,377; 3,322,102; 3,074,074; 2,853,220; 2,651,446; 2,275,450; 1,490,066; 716,109 and 292,769.

BRIEF SUMMARY OF THE INVENTION

The harness comprises a length of strong fabric webbing which may be several inches in width which is loosely passed through a pair of D-shaped rings with the ends of the webbing thereafter being joined together in a closed loop to form two semicircular loops when suspended from the D-rings. For this purpose a length of rope, of nylon, dacron or other suitable material is passed through a ring and then doubled back upon itself, the two strands passing first through another ring provided with a snap hook and then through a frictionally engaging adjusting slide. The two ends of the rope are then attached to the respective D-rings, preferably by snap hooks, knots or adjustable connectors.

A modified form of the invention used two closed loops of webbing of approximately the same length which are passed through the pair of rings independently of each other. When doubled back upon themselves there are provided four loops of webbing which can pass around the back and thighs of the wearer to provide a sort of craddle which offers a more comfortable seat than the single pair of loops previously described.

Furthermore, instead of a double rope for supporting the cradle, a single length of webbing can be employed. At one end a substantial length of the webbing is passed through both of the rings of the cradle. The mid point of that loop and the free end of the webbing are then secured to the remainder of the webbing to form two diverging loops each attached to a respective one of the rings. The remainder of the lengthwise margins of the webbing are turned inwardly and served together to form a thin rope-like supporting, or towing line having greater strength than a rope of equivalent diameter.

BRIEF DESCRIPTION OF THE DRAWINGS

FIG. 1 is a perspective view of a preferred form of harness in accordance with this invention;

FIG. 2 is a fragmentary view of a modified form of webbing;

FIGS. 3 and 4 are side view of the harness being used as a sling;

FIG. 5 is a view of the harness when used for dragging a load along the ground;

DESCRIPTION OF A PREFERRED EMBODIMENT

Figure 6:
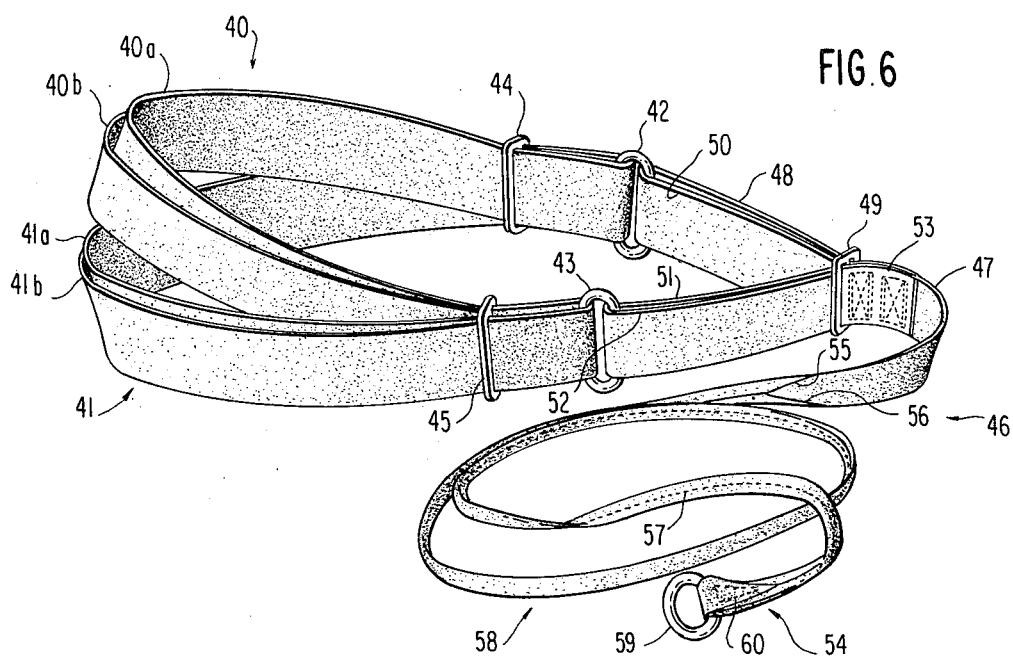
FIG. 6 is a perspective view of a modified form of harness in accordance with this invention.

In the drawings, the numeral 10 indicates generally a length of fabric, such as canvas webbing several inches in width which passes through two D-shaped rings 11 and 12 and has its end secured together by means of an adjustable clasp means 13 which allows the webbing to form a closed loop of adjustable length which, when suspended from the rings 11 and 12 is subdivided into two semicircular loops 14 and 15 whose lengths may individually vary with respect to each other in use depending upon how the harness is used. These changes are automatically accomplished because the webbing is free to move through both of the rings in either direction.

The rings 11 and 12 are attached to the respective ends of a load bearing rope, indicating generally by numeral 16, preferably by means of connectors 17 and 18. The rope passes through a ring 19 and is doubled back upon itself to form two parallel strands 20 and 21 which first pass together through a loosely fitting ring 22 provided with another snap hook 23. From there the strands pass through a slidable frictionally engaging adjusting means, indicated generally by number 24. In one form this device may comprise an oblong ring having a transverse cross-bar 27 dividing the ring into two sections 25 and 26. The two strands 20 and 21 are passed upwardly through section 26, over the bar 27 and downwardly through section 25.

FIG. 3 illustrates one way in which the harness can be used, for example by a hunter, standing on the limb 28 of a tree 29. The ring 19, carrying the doubled-over end of the rope is passed around the tree 29 and engaged with the snap hook 23. One of webbing loops 14 forms a seat, while the other loop 15 serves as a back support. The sliding adjustment means 24 is pulled toward the waist where frictional engagement between the rope strands and cross-bar 27 will maintain the loops 14 and 15 in close engagement with the body. Also, as soon as any force is exerted on the rope the ring 22 will slide along the rope to a point close to the tree so that a loop 30 will be formed which will resist any tendency for the harness to slip downwardly.

While the harness described is self-adjusting in the sense that the webbing 14 is freely slidable through the D-rings 11 and 12 to allow each of the loops 14 and 15 adjust their respective lengths to conform to the anatomy of whoever is using their harness, in some cases it may be desirable to use a form of webbing which is fabricated to urge the webbing to adopt a position with respect to the rings 11 and 12 wherein the lengths of the loops is more or less predetermined, as illustrated in FIG. 2. In this modification, once the desired relative lengths of loops 14 and 15 have been chosen the shape of the webbing is provided with a double tapering width indicated by numerals 31 and 32 along its length as it approaches one, or both, of the D-rings and, in this case, a smaller ring, indicated by numeral 33, will be substituted which has a size small enough to impede movement of the webbing in either direction away from the location of its narrowest width 34. This tapering of the webbing can be accomplished by adjustments of the textile machine which forms the web, or by folding over opposite margins and sewing them in place as shown in FIG. 2.

While FIG. 3 shows the harness as used in a seated, or semi-crouching position, the two loops 14 and 15 can be arranged to overlap each other to provide a seat, or both can be arranged around the back for climbing, or descending, the tree 29, as shown in FIG. 4.

The hunter, having bagged his game, may use the harness for dragging an animal, such as a deer 34, out of the woods, without the necessity for adjusting, or changing, the harness in any way. The loop 30, formed by attaching hook 23 to ring 19 can be placed around a part of the animal, such as a leg 35, and the loops 14 and 15 of the webbing can be slipped over the hunter's shoulders to haul the animal away. Due to the short length of rope needed to wrap around the leg 35, an extra length of the rope 24 is available than when the loop is applied to a tree trunk and this extra length allows the hunter to stand erect while pulling the load.

In FIG. 6, there is shown a modified form of the invention in which all of the flexible elements are fabricated from elongated woven webbing to provide a cradle comprising two closed loops, indicated generally by numerals 40 and 41 of approximately equal length, both pass independently and freely through a pair of metal rings 42 and 43 and are doubled back upon themselves to form partial loops 40a; 40b; 41a and 41b. In addition, after being doubled back upon themselves all of the partial loops pass through a pair of slidable buckles 44 and 45 which serve to gather the loops together just behind the rings 42 and 43, as well as to control the size of the partial loops in accordance with needs and bodily size of the user.

The modified form of rope means, indicated generally by numeral 46, while described in connection with the embodiment of cradle shown in FIG. 6, can also be used with the cradle disclosed in FIGS. 1-5. This rope means comprises a single length of webbing, preferably woven of nylon filament, or the equivalent comprises a medial portion 47 from which a length of webbing 48 first passes through a slidable buckle 49 to the ring 42; from which the length of webbing 50 returns through the buckle 49 back to portion 47. At that point the webbing is doubled upon itself and further length of webbing 51 passes back through buckle 49 to the ring 43 and after passing through the ring a final length of webbing 52 returns through buckle 49 to the place where the ends of lengths 50 and 51 are doubled upon themselves adjacent the medial portion 47. The free end of length 52 and the doubled over ends of lengths 50 and 51 are all sewed together at 53 with the portion of the webbing that initiates the portion 48. In this way the lengths of webbing 48 and 50 forms one of a pair of diverging ends of the rope means 46, of which the other end of the diverging pair comprises the lengths of webbing 51 and 52. The lengths of these diverging ends can be adjusted by sliding the buckle 49 in the same way that adjustment means 24 of the previous modification is used to adjust the size of the harness to the user's body.

In the other direction of the rope means 46, beginning of the medial area 47 and extending to the free end 54, the opposite margins 55 and 56 are turned inwardly along their lengths so as to lie one upon another in overlapping relationship upon the central area of the webbing. The three overlapping layers are secured together, as by a line of stitching 57 extending lengthwise of the webbing, with the result that this elongated portion of webbing, indicated generally by numeral 58, can be handled, knotted, tied or spliced in the manner of the usual circular rope. The free end 54 of portion 58 is provided with a weighted element, such as a ring 59, by passing the end of the webbing through the ring and sewing the web at 60. If desired, the ring may be padded to reduce the possibility of creating noise if the ring should strike against a solid object.

Figure 7:
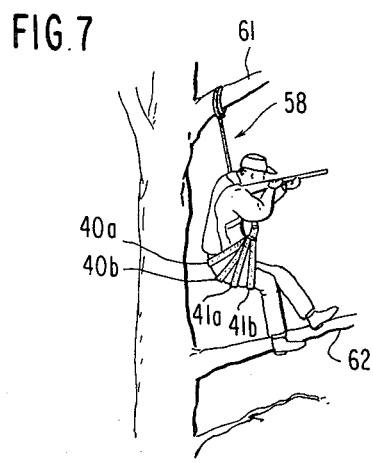
FIG. 7 is a view of the harness when used to support a hunter in sitting position on a tree limb.

As shown in FIG. 7, the loops of the harness, when passed around the body in the same manner as with the first embodiment can be spread out so that the partial loops 40a and 40b support the back at two places while the partial loops 41a and 41b fit under the thighs at two locations. By making the rope section 58 of sufficient length, it can be thrown upwardly so that the weighted end will be carried over a supporting member, such as the upper branch 61 of a tree. The rope section can then be secured in any usual way, as by a slip-knot, so that a hunter may remain in a seated position with his feet on a lower limb 62.

Figure 8:
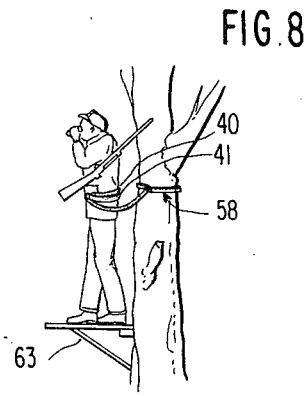
FIG. 8 is a view of the harness when used in standing position on a tree stand.

In areas of the country where it is permissible to attach a tree stand 63 to a tree, as shown in FIG. 8, so that the user can easily remain in a standing position, the loops 40 and 41 can be combined and secured around the waist, while the rope portion 58 is tied around the trunk of the tree as a safety precaution.

Figure 9:
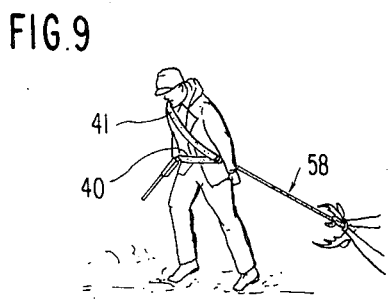
FIG. 9 is a view of the harness when used to tow a load on the ground.

When using the harness for dragging game along the ground, as shown in FIG. 9, it is useful to wrap one of the loops 40 around the waist, while the loop 41 is passed over one shoulder to keep the first loop from falling to the ground when there is slack in the rope portion 58. The advantage of this arrangement is that the load is placed in a direct line with the hunter's waist, which eliminates the body lever load or what may be called the "sit-up" load. In this way, each time the hunter leans forward the weight of his body moves the load easily and almost effortlessly.

Figure 10:
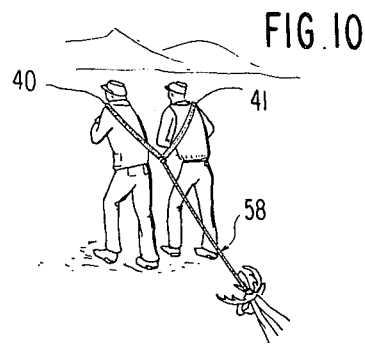
FIG. 10 is a view of the harness when used to distribute the towing load between two persons.

In FIG. 10, a further towing arrangement is shown for sharing a load between two people, walking side by side. In this case the respective loops 40 and 41 are each passed around the bodies of the two persons with the loops going under the inside shoulders of each one and over their respective outside shoulders.

What I claim is:

1. In a self-adjustable harness for selective use alternatively as a sling when attached to a fixed support to cradle or stabilize, a human body or as a towing harness for pulling a movable object, comprising:
   a first pair of endless straps of approximately equal linear dimension to be disposed upon a user's body;
   a pair of independent rings through which both of said straps are loosely slidable;

elongated rope means comprising a separate length of strap means having one end adapted to be secured selectively to a fixed support or to an object to be pulled;

said first pair of endless straps being doubled back upon themselves in passing through each of said rings to provide a cradling means for the body of a user or to be worn on the body when pulling an object;

the other end of said separate strap means including a buckle means through which said length of strap means passes serially to each of said rings in one direction to thereafter pass through each of said rings and to return in the opposite direction to pass again through said buckle means, whereby four plies of material are disposed on the side of said buckle means away from said rings, said four plies of material being secured to each other at that location;

said buckle means being slidable on said strap means toward and away from said rings to vary the size of said cradling means.

2. A harness as defined in claim 1, wherein said one end of the rope means terminates in a weighted element to enable said one end to be thrown upwardly over a support and to return to a user below said support.

3. A harness as defined in either one of claims 1 or 2, wherein both of said second pair of straps are formed from a single continuous length of cloth webbing.

4. A harness as defined in claim 3, wherein the respective opposite side margins of said webbing are turned inwardly toward each other and joined together along a portion of the length of the webbing adjacent said one end of the rope means.

5. A harness as defined in either one of claims 1 or 2, wherein said first pair of endless straps as they pass through a respective one of said rings are doubled back upon themselves in overlapping relationship to provide four plies of material extending away from one side of each ring, and a slidable buckle closely encircles said four plies of material.

6. A harness as defined in claim 5, wherein said first pair of straps comprise cloth webbing.

7. A harness as defined in claim 6, wherein said rope means comprises cloth webbing.

8. A harness as defined in claim 7, wherein said rope means comprises a continuous length of cloth webbing.

* * * * *